US009091449B2

(12) United States Patent
Donaldson et al.

(10) Patent No.: US 9,091,449 B2
(45) Date of Patent: Jul. 28, 2015

(54) ICE AIR CONDITIONER

(71) Applicant: ICYBREEZE, LLC, Bixby, OK (US)

(72) Inventors: Clint Donaldson, Broken Arrow, OK (US); David Yonce, Broken Arrow, OK (US)

(73) Assignee: ICYBREEZE, LLC, Bixby, OK (US)

( * ) Notice: Subject to any disclaimer, the term of this patent is extended or adjusted under 35 U.S.C. 154(b) by 212 days.

(21) Appl. No.: 13/779,442

(22) Filed: Feb. 27, 2013

(65) Prior Publication Data

US 2013/0233002 A1  Sep. 12, 2013

Related U.S. Application Data

(60) Provisional application No. 61/603,688, filed on Feb. 27, 2012.

(51) Int. Cl.
*F24F 5/00* (2006.01)
*F25D 3/08* (2006.01)
*F24F 1/02* (2011.01)

(52) U.S. Cl.
CPC ............... *F24F 5/0021* (2013.01); *F24F 1/02* (2013.01); *F24F 5/0017* (2013.01); *F25D 3/08* (2013.01); *F24F 2221/12* (2013.01); *Y02E 60/147* (2013.01)

(58) Field of Classification Search
CPC ......... F24F 5/0021; F24F 5/0017; F24F 1/02; F24F 2221/12; F25D 3/08; Y02E 60/147
USPC .............. 62/99, 420, 426, 424, 406, 457.1, 62/457.2, 457.7, 457.9, 434, 464
See application file for complete search history.

(56) References Cited

U.S. PATENT DOCUMENTS

| | | | |
|---|---|---|---|
| 3,961,496 A * | 6/1976 | Ku | 62/459 |
| 5,685,165 A * | 11/1997 | Bigelow, Jr. | 62/420 |
| 6,026,653 A * | 2/2000 | Presnell | 62/177 |
| 6,227,004 B1 * | 5/2001 | Gerstein | 62/421 |
| 6,354,104 B1 * | 3/2002 | Feagin | 62/457.1 |
| 6,357,243 B1 * | 3/2002 | Efron et al. | 62/171 |
| 6,568,202 B1 | 5/2003 | Hodges | |
| 6,571,568 B1 * | 6/2003 | Link | 62/244 |
| 6,886,360 B1 | 5/2005 | Rosenbaum et al. | |
| 7,143,589 B2 * | 12/2006 | Smith et al. | 62/94 |
| 7,155,924 B2 | 1/2007 | Zuckerman et al. | |
| 7,188,489 B2 | 3/2007 | Martello | |
| 7,246,505 B2 * | 7/2007 | Navedo et al. | 62/420 |
| 7,603,875 B2 * | 10/2009 | Carr | 62/457.7 |
| 7,748,235 B1 * | 7/2010 | Franklin et al. | 62/420 |
| 7,805,958 B2 * | 10/2010 | Bratcher | 62/420 |
| 7,814,764 B1 * | 10/2010 | Heater et al. | 62/476 |
| 7,886,548 B1 * | 2/2011 | Graves | 62/93 |

(Continued)

FOREIGN PATENT DOCUMENTS

| | | |
|---|---|---|
| KR | 10-2008-0092993 | 10/2008 |
| WO | 2006/028473 A1 | 3/2006 |
| WO | PCTUS2013028067 | 6/2013 |

*Primary Examiner* — Mohammad M Ali
(74) *Attorney, Agent, or Firm* — David G. Woodral; Fellers, Snider, Blankenship, Bailey & Tippens, P.C.

(57) ABSTRACT

A device includes a portable chest, a radiator in the chest, a liquid pump in the chest that moves liquid through the radiator, and a fan for providing an airflow across the radiator. The portable chest stores a quantity of chilled water that is pumped through the radiator by the liquid pump to chill the airflow provided by the fan.

1 Claim, 5 Drawing Sheets (56) References Cited

U.S. PATENT DOCUMENTS

| | | | |
|---|---|---|---|
| 8,176,749 B2 * | 5/2012 | LaMere et al. | 62/457.5 |
| 2005/0029030 A1 * | 2/2005 | Ewert | 180/167 |
| 2005/0268622 A1 * | 12/2005 | Krieger | 62/3.6 |
| 2008/0178629 A1 * | 7/2008 | Meether | 62/451 |
| 2011/0030413 A1 * | 2/2011 | Heil | 62/407 |

* cited by examiner

ICE AIR CONDITIONER

CROSS REFERENCE TO RELATED APPLICATIONS

This application claims the priority of U.S. Provisional Patent Application No. 61/603,688 entitled "ICE AIR CONDITIONER," filed Feb. 27, 2012, the contents of which are hereby incorporated by reference.

FIELD OF THE INVENTION

This disclosure relates to cooling devices in general and, more specifically, to devices for cooling air by exposure to ice.

BACKGROUND OF THE INVENTION

Outdoor activities are enjoyed by many already but hot weather can often reduce this enjoyment. Further, genuine dangers may exist to some who become too hot. Unfortunately, many outdoor activities are only available in the summer. Parents, grandparents, and other family members may wish to watch outdoor summer sports or attend the beach with family, for example, but are limited in their ability to do so because of the heat. However, having a way to stay cool outdoors in the heat would be advantageous for comfort and endurance, even if one is otherwise able to safely endure the heat.

What is needed is a system and method for dealing with the above, and related, problems.

SUMMARY OF THE INVENTION

The invention of the present disclosure, in one aspect thereof, comprises a device including a portable chest, a radiator in the chest, a liquid pump in the chest that moves liquid through the radiator, and a fan for providing an airflow across the radiator. The portable chest stores a quantity of liquid that is pumped through the radiator by the liquid pump to chill the airflow provided by the fan.

In some embodiments, the portable chest is a portable ice-based cooler. The device may include a remote control that activates the liquid pump and fan. In some embodiments, the device includes a power supply for powering the pump and fan. A user accessible control panel may be provided that has at least controls for turning the liquid pump and fan on and off. The control panel may provide a control for allowing a user to adjust between at least two operating fan speeds.

The portable chest of the device may include a lid and an ice reservoir. The lid may be hinged to the ice reservoir, and retains the radiator and fan, while the ice reservoir retains the liquid pump. The lid may define an airflow path for directing air through the radiator and outside the device. The airflow path may include a flexible portion that may be manipulated by a user to at least partially define the airflow path.

In some embodiments, the ice reservoir comprises an outer shell and a liner. At least the outer shell may be molded to accept an axle attached to a pair of wheels. The outer shell may provide a tow handle for operation in conjunction with the wheels.

The invention of the present disclosure, in another aspect thereof, comprises a device having an insulated chest for containing a quantity of liquid, a lid for the chest defining an airway and having a radiator in the airway for chilling air and a fan that moves the air through the airway and out of the lid, and a pump in the insulated chest that moves water from the chest, through the radiator, and back to the chest.

In some embodiments, the device further comprises a power supply operatively coupled to the fan and the pump. The device may include a user accessible control panel that allows a user to control at least power to the pump and fan.

The lid may be made from an upper shell and a lower shell that connect together to define at least a portion of the airway. A portion of the airway may be flexible and manipulable by a user to change a location where chilled air exits the lid. The upper shell and lower shell may define two air shafts with a user manipulable flexible vent tube therebetween.

The invention of the present disclosure, in another embodiment thereof, comprise a method that includes providing an chest with a liquid reservoir and a lid, defining an air path in the lid, providing a liquid pump inside the ice reservoir, providing a radiator and fan in the lid as part of the air path, pumping chilled water from the insulated chest to the radiator, and moving air through the air path with the fan, through the radiator, and outside the lid.

The method may also include providing a battery inside the lid that selectively powers the pump and fan and/or providing a user control for activating the pump and fan.

The invention of the present disclosure, in another aspect thereof, comprises a device with a portable chest defining an airway and a liquid reservoir. The device includes a first radiator in the airway, a second radiator in the liquid reservoir, a fan that move air through the airway, and a pump that moves liquid from the second radiator to the first radiator.

DETAILED DESCRIPTION OF THE PREFERRED EMBODIMENTS

Figure 1:
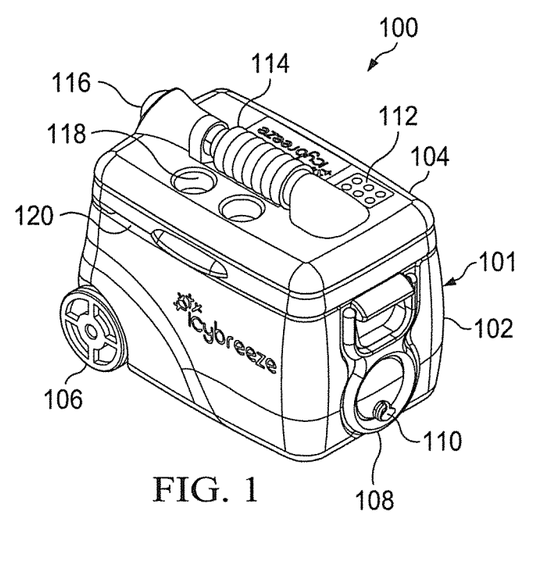
FIG. 1 is a perspective view of one embodiment of a portable air conditioner according to aspects of the present disclosure.

Referring now to FIG. 1, a perspective view of one embodiment of a portable air conditioner 100 according to aspects of the present disclosure as shown. In the present embodiment, the portable air conditioner 100 has a chest 101 which may comprise a reservoir 102 with a lid 104. In other embodiments, the chest 101 may have a sliding opening, a clamshell opening, or another configuration. The reservoir 102 and lid 104 may comprise molded plastic or other materials. As the air conditioner 100 is designed to be portable, some embodiments will provide attached wheels 106 and/or a tow handle 108. In the present embodiment, the handle 108 stows against the reservoir 102 when not in use. The handle 108 hinges outward for lifting a portion of the reservoir 102 and pulling the reservoir 102 on the wheels 106. A drain 110 may be accessible from outside the reservoir 102.

The portable air conditioner 100 provides a control panel 112 that is accessible from outside the lid 104. As will be described in greater detail below, the control panel 112 operates the functions of the portable air conditioner 100. The portable air conditioner 100 can produce a stream of chilled air via the internal vent 116 or via a flexible vent tube 114. Air is drawn into the portable air conditioner for cooling through one or more vents 120, which may be located at the conjunction of the lid 104 and the reservoir 102. It will be appreciated that the lid 104 can be configured to provide other traditional functions of an ice chest or other outdoor equipment such as molded drink holders 118.

Figure 2:
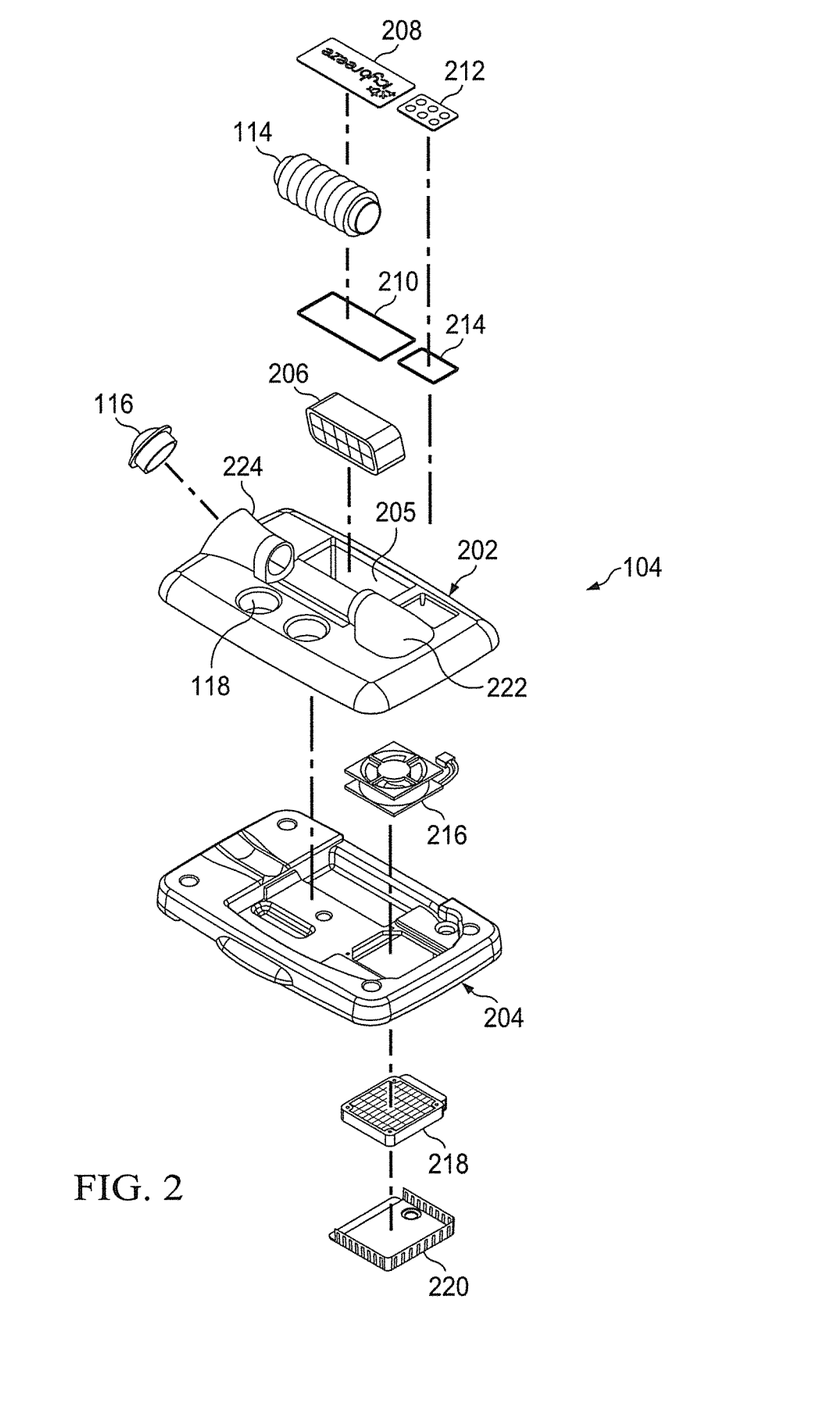
FIG. 2 is an exploded perspective view of the lid of the portable air conditioner of FIG. 1.

Referring now to FIG. 2, an exploded perspective view of the lid 104 of the portable air conditioner 100 is shown. The lid 104 may comprise an upper shell 202 fitted with a lower shell 204. The upper shell 202 and lower shell 204 may comprise a molded plastic material and may fit together via fasteners, interference fit, electronic welding, or other means known in the art. As explained herein, one of the major functions of the lid 104 is to retain a significant number of the components associated with the air cooling function of the portable air conditioner 100. The lid 104 may provide insulation (not shown) between all or portions of the upper shell 202 and lower shell 204. In other embodiments, the lower shell 204 additionally contains insulation.

The upper shell 202 may provide a recessed compartment 205 for containing a battery 206 or other power supply. In other embodiments, the battery 206 and its compartment 205 could be located elsewhere (e.g., in the reservoir 102). The battery 206 may be a rechargeable battery based on nickel-cadmium, nickel-metal hydride, lithium or other battery technology. In some embodiments, the battery 206 is a 12 volt battery with a capacity of 10,000 mAh. Provisions may also be made for an A/C or D/C adapter (not shown) to recharge the battery 206 and/or power the air conditioner 100. In some embodiments, the compartment 205 may be configured to accept a number of disposable-type batteries such as a lantern battery, D-cells or the like. The compartment 205 may be provided with a cover 208. A gasket or o-ring 210 may be provided to seal the cover 208 over the battery 206 within the battery compartment 205 to keep water out of the battery compartment 205.

The control panel 212 may be housed at least partially within the upper shell 202 and/or lower shell 204. The control panel may be of a design that is at least somewhat weather resistant in order to allow the portable air conditioner 100 to safely be utilized outdoors. In furtherance of weatherproofing the control panel 212 may seal into the upper shell 202 via a gasket 214 or o-ring.

Housed within the lid 104 possibly between the upper shell 202 and lower shell 204 is an electronic fan 216. In the present embodiment, the fan 216 is a direct current fan. In some embodiments, the fan 216 is a 12-volt fan with a capacity of 226 cubic feet per minute. It may be adapted from a 105 mm PC case fan, sourced from another fan, or it may be custom constructed for use with the air conditioner 100. In other embodiments an alternating current fan could be utilized if it were properly compatible with the battery 206 and/or control panel 212. Attached to the lower shell 204 and/or upper shell 202, in close proximity to the fan 216, is a radiator 218. The radiator may be made from aluminum or another material with good thermal conductive properties. As will be explained more fully below, the radiator 218 will be filled with a chilled liquid (e.g., water). The fan 216 will draw air from within the reservoir 102 over the radiator 218 where the air will be chilled before being exhausted through the lid 104 for cooling purposes. Some embodiments will provide a cover or filter 220 covering or surrounding the radiator 218 to prevent the radiator 218 from becoming dirty or clogged as air travels through it.

From FIG. 2, it will be appreciated that between the upper shell 202 and lower shell 204 a continuous pathway for air that is drawn in through the cover 220 and radiator 218 by the fan 216 is routed through the lid 104 and the vent 116 or the flexible vent tube 114. The upper shell 202 provides an air shaft 222 receiving chilled air under pressure from the fan 216 and communicating it to the flexible vent tube 114. The upper shell 202 also cooperates with the lower shell 204 to define another air shaft 224. The flexible vent tube 114 may be attached between the air shaft 222 and the air shaft 224 to direct chilled air to and through the vent 116. However, the flexible vent tube 114 may also be detached by a user from the air shaft 224 while remaining connected to the air shaft 222 in order to direct the chilled air to a location other than the vent 116.

In the illustrated embodiment of FIG. 2, the fan 216 and radiator 218 are retained within the lid 104. However it is understood that, in other embodiments, the fan 216 and radiator 218 could be configured to function in another part of the air conditioner 100 (for example, they could be located in the reservoir 102).

Figure 3:
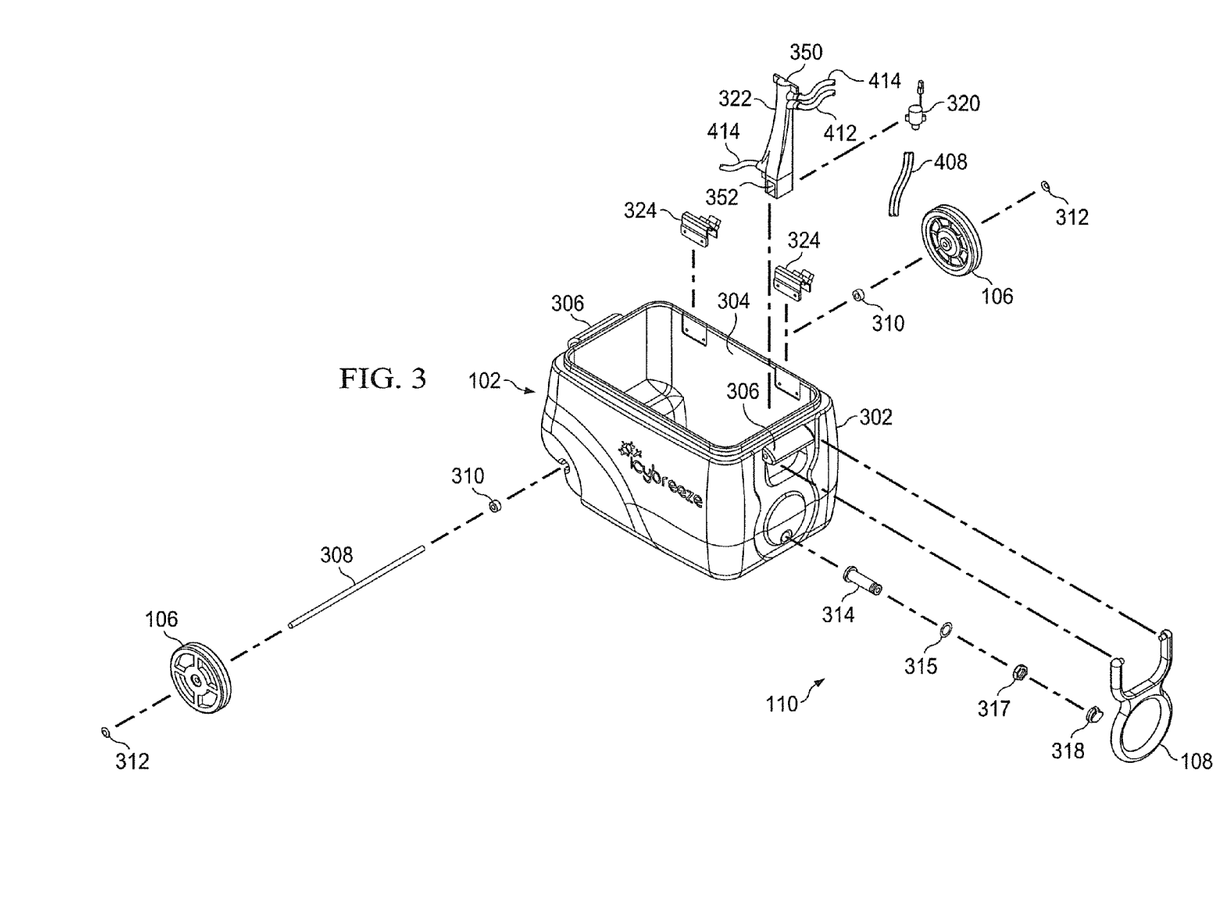
FIG. 3 is an exploded perspective view of the chest of the portable air conditioner of FIG. 1.

Referring now to FIG. 3, an exploded perspective view of the reservoir 102 of the portable air conditioner 100 is shown. The reservoir 102 functions as an ice water reservoir and may comprise a shell 302 provided with a liner 304. The shell 302 and liner 304 may be molded plastic or another suitable material. In some embodiments the reservoir 102 is insulated with insulation (not shown) between all or portions of the shell 302 and liner 304. The air conditioner 100 is designed to be portable and may provide additional lift handles 306 molded into the shell 302.

As previously discussed, the portable air conditioner 100 may provide wheels 106 and/or a lift handle 108. The shell 302 and/or liner 304 may be molded to accept the wheels 106 as an integral part of the air conditioner 100. In the present embodiment, the wheels 106 are attached to an axle 308 fitted to the shell 302 by bushings 310. In some embodiments, the wheels 106 may be held in place by caps 312. In other embodiments, the wheels 106 may be detachable from the reservoir 102 or shell 302 rather than integrated as shown.

The drain 110 can be seen here to comprise a number of individual pieces. A drain body 314 is provided and traverses from inside the liner 304 to outside the shell 302. The drain body 314 may be retained in place by a gasket 315 and nut 317. A drain plug 318 may be provided for opening and closing the drain 110.

Situated within the liner 304 near a lower portion thereof is a liquid pump 320. In some embodiments, the pump 320 is a 12-volt electrically powered impeller based pump. It may have a flow rate of around 3 liters per minute. The pump 320 may be utilized for moving liquid from within the reservoir 102 to the lid 104, and particularly to the radiator 218. In some embodiments the portable air conditioner 100 may also function as a beverage cooler or ice chest, which may call for additional structure or organization of components within the reservoir 102.

The pump 320 may protected and/or held in place by a cover 322. The cover 322 attaches to the interior of the liner 304. The pump 320 is situated inside the cover 322 when it is installed. The cover provides a conduit for a chilled liquid line 412 that attaches to the pump 320 for moving liquid to the radiator 218. A return line 414 is also provided and traverses all or a part of the length of the cover 322 before exiting. In some embodiments, a length of the return line 414 extends away from the cover 322 in order to exhaust the return liquid some distance away from the pump 320, which may draw chilled liquid primarily through an opening 352 in the cover 322. Both the pump 320 and the opening 352 may be near a lower portion of the cover 322 and be situated relatively low in the reservoir 102. This allows the pump 320 continuous access to chilled liquid in the reservoir 102 even if the liquid level is not high.

As the pump 320 may be powered from a power supply within the lid 104, it may also be necessary to route a power connection 408 down into the reservoir 102 and to the pump 320. In the present embodiment, the cover 320 provides a path for the power connection 408. A small opening 350 may be defined near an upper portion of the cover 320 for passing the power connection 408 down from the lid 102.

From the foregoing, it will be appreciated that, particularly where the air conditioner 100 also serves as a beverage cooler or the like, the cover 322 safely stows and routes the pump 320, liquid 412, 414 and/or other components lines.

Figure 4:
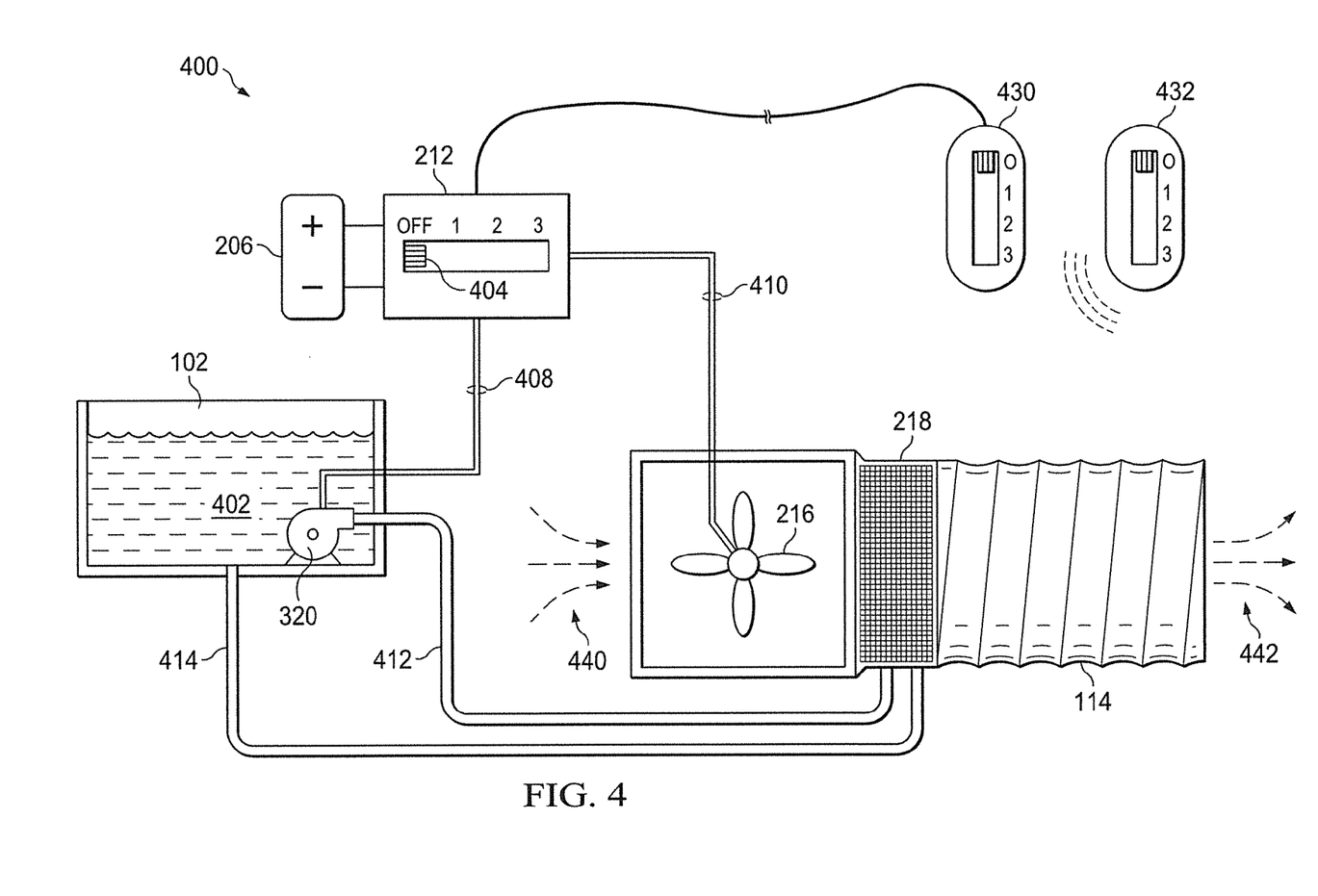
FIG. 4 is a schematic diagram of the portable air conditioner of FIG. 1.

With the major components of the portable air conditioner 100 having been described in various physical, a schematic diagram 400 of the cooling operation is provided in FIG. 4. Various components of the portable air conditioner 100 having already been discussed explicitly are laid out once again in the schematic diagram 400. For example, the control panel 212 is seen attached to the battery 206. The liner 304 of the reservoir 102 is shown in FIG. 4 filled with ice water 402. The functional location of the flexible vent tube 114 relative to the radiator 218 and the fan 216 can also be seen in the schematic diagram 400. In coming air 440 is drawn in by the fan 216 and forced through the radiator 218 and out through the flexible vent tube 114 as chilled air 442.

In the present embodiment, the control panel 212 provides at least two user selectable functions, including activating the unit and adjusting a speed of the fan 216. A rotary switch 404 provides at least three positions including an off position and three on positions. In the present embodiment, the fan 216 and pump 320 will be activated at least at a minimum speed anytime the power switch 404 is activated, or moved from the off position. The fan speed may be turned up further by utilizing second and third positions of the switch 404, which may control a medium and high setting, respectively, for the fan 216. It is understood that other types of switches may provide similar functionality. For example, a rotary knob, sliding switch, or a series of rocker and/or toggle switches may be utilized.

The control panel 212 may act as a variable switch between the battery 206 and the fan 216 to provide varying amounts of power or current via power leads 410. In other embodiments, the control panel 212 acts as part of a relay for activating the fan 216.

In the present embodiment any time the portable air conditioner 100 is activated the control panel 112 will provide power via power leads 408 to the pump 320. The control panel 212 may function in this regard as a switch between the battery 206 and the pump 320. However, it may also function as part of a relay circuit. In the present embodiment, the control panel 212 and/or battery 206 will provide a level of power or current to the pump 320 to keep it efficiently operating to continuously provide the radiator 218 with chilled water via the chilled water path 412. In some embodiments, the control panel 112 may also control pump speed selectively.

The chilled water path 412 may comprise various conduits, hoses and pathways as are known to one as skilled in the art for being suitable for transporting chilled water. A return water path 414 between the radiator 218 and the liner 304 is also provided. This too may comprise various conduits, hoses and pathways as are known in the art.

It will be appreciated that in operation, a user may fill the portable air conditioner 100 with ice and/or water, which will be maintained in a chilled state by the insulating properties of the reservoir 102. It is contemplated that many users will also place beverages or other food items within the reservoir 102. So long as a minimal volume of chilled water is allowed to remain in the reservoir 102, the water may be pumped by the pump 320 to the radiator 218 where the fan 216 can utilize the same for lowering air temperature. The cooled air will then be directed via the lid 104 to a location desired by a user.

The portable air conditioner 100 may be wheeled or carried to a desired location and activated for providing cooling functions. As the portable air conditioner 100 utilizes the cooling capacity of internally stored ice and/or water, it is understood that the cooling function of the portable air conditioner 100 will fall to an unacceptable level over a period of time. However, it is easy for a user to simply add more ice and/or drain some of the existing water via the drain 110. It is also true that for a typical outing utilizing an ice chest that additional cooling capacity may be had, as it is often the case that ice must be emptied or dumped from a typical ice chest at the end of its use.

To further increase the convenience of the portable air conditioner 100, a wired remote 430 may be employed instead of, or in addition to, the control panel 112. This allows a user to control the portable air conditioner 100 without having to be nearby, or without having to fully divert attention away from another task. For example, the portable air conditioner 100 may be controlled from the driver's seat of a vehicle or the pilot's seat of an aircraft. In some embodiments, a wireless remote control 432 may provide similar functionality as a wired remote, but possibly in a more convenient fashion.

Throughout the present disclosure, use of liquids is discussed for use in the air cooling function of the portable air conditioner 100. In some cases, this liquid will be understood to be water, or ice water. Normally, after a short time in a cooler or ice chest, a certain amount of ice will melt to water, which may be used with the systems of the present disclosure. A small amount of salt may be added to the reservoir 102 to speed this process. It is understood that crushed or block ice could be used. In other cases the ice may be sequestered from the liquids that are allowed to flow. For example, cold packs, ice packs, or even dry ice may be used to chill the liquid used by the radiator 218 and other components for cooling air. In this respect, the cooling liquid does not even have to be water. In cases where food or beverages are not to be stored within the portable air conditioner 100 other efficient liquids could be used, such as ethylene glycol mixtures. However, the present disclosure also provides for a way for the liquid circulating through the radiator 218 to be something more efficient than water, while still allowing the portable air conditioner 100 to function as an ice chest or beverage cooler.

Figure 5:
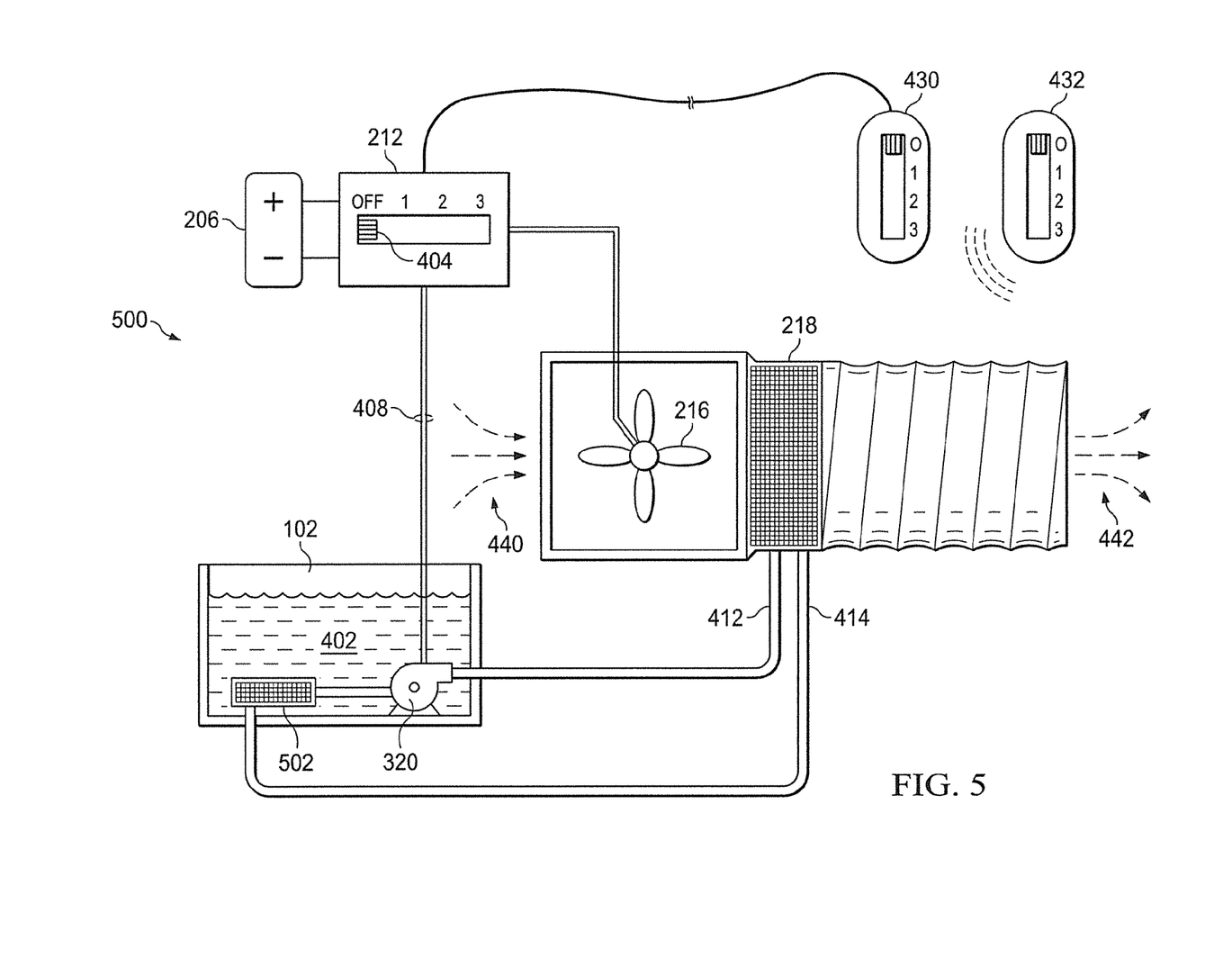
FIG. 5 is a schematic diagram of another portable air conditioner according to aspects of the present disclosure.

Referring now to FIG. 5, a schematic diagram of another portable air conditioner 500 according to aspects of the present disclosure is shown. The portable air conditioner 500 illustrated schematically in FIG. 5 may have a similar physical appearance as that shown in FIGS. 1-3. However, rather than exhausting the return line 414 into the water 402 in the reservoir 102 or liner 304, it is circulated back into a second radiator 502. This second radiator 502 will be submerged in the reservoir 102 or chest 101 and exposed to the ice water 402. Hence the liquid therein will be re-chilled before being pumped by the pump 320 back into the radiator 218 for chilling air once more. With the cooling liquids sequestered from the user accessible liquids (e.g., the ice water 402), other liquids that are more efficient than ice water at heat removal may be employed.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A device comprising:
   a chest for containing a quantity of liquid;
   a lid for the chest defining an airway and having a radiator in the airway for chilling air and a fan that moves the air through the airway and out of the lid; and
   a pump in the insulated chest that moves liquid from the chest, through the radiator, and back to the chest, the chest having upper shell and lower shell;
   a power supply operatively coupled to the fan and the pump;
   a flexible portion of airway that is manipulable by a user to change a location where chilled air exits the lid;
   wherein the upper shell and lower shell define two air shafts with the user manipulable flexible vent tube therebetween.

* * * * *